(12) United States Patent
Hatase et al.

(10) Patent No.: US 12,486,573 B2
(45) Date of Patent: Dec. 2, 2025

(54) THIN-FILM FORMING RAW MATERIAL, THIN-FILM AND METHOD OF PRODUCING THIN-FILM

(71) Applicant: ADEKA CORPORATION, Tokyo (JP)

(72) Inventors: Masako Hatase, Tokyo (JP); Chiaki Mitsui, Tokyo (JP); Atsushi Yamashita, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 12 days.

(21) Appl. No.: 18/571,903

(22) PCT Filed: Jun. 17, 2022

(86) PCT No.: PCT/JP2022/024289
§ 371 (c)(1),
(2) Date: Dec. 19, 2023

(87) PCT Pub. No.: WO2023/276716
PCT Pub. Date: Jan. 5, 2023

(65) Prior Publication Data
US 2024/0301553 A1 Sep. 12, 2024

(30) Foreign Application Priority Data
Jul. 1, 2021 (JP) .................... 2021-110128

(51) Int. Cl.
*B32B 3/10* (2006.01)
*C23C 16/18* (2006.01)
*C23C 16/455* (2006.01)

(52) U.S. Cl.
CPC ........ *C23C 16/45553* (2013.01); *C23C 16/18* (2013.01)

(58) Field of Classification Search
None
See application file for complete search history.

(56) References Cited

U.S. PATENT DOCUMENTS

2002/0140005 A1 10/2002 Chung et al.
2004/0009679 A1 1/2004 Yeo et al.
(Continued)

FOREIGN PATENT DOCUMENTS

JP 2004-56142 A 2/2004

OTHER PUBLICATIONS

Wijk et al., "Synthesis, Characterization, and Structural Determination of the Bimetallic Alkoxide ErAl3(OC3H7i)12", Inorganic Chemistry, vol. 35, No. 4, Feb. 14, 1996, pp. 1077-1079.
(Continued)

*Primary Examiner* — Christopher M Polley
(74) *Attorney, Agent, or Firm* — GREENBLUM & BERNSTEIN, P.L.C.

(57) ABSTRACT

Provided is a thin-film forming raw material, including an alkoxide compound represented by the following general formula (1):

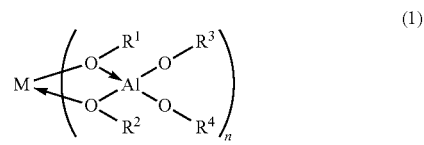

where $R^1$ to $R^4$ each independently represent an alkyl group having 1 to 5 carbon atoms, M represents a rare earth metal atom, and "n" represents a valence of the rare earth metal atom.

7 Claims, 4 Drawing Sheets

(56) References Cited

U.S. PATENT DOCUMENTS

2004/0180493 A1 9/2004 Chung et al.
2006/0234517 A1 10/2006 Yeo et al.
2009/0061170 A1* 3/2009 Fujikawa ............. H05K 3/4038
427/407.1
2011/0121376 A1 5/2011 Vaartstra

OTHER PUBLICATIONS

Misra et al., "Bimetrallic isopropoxides M[Al(-OC3H7i)4]3 (M=Pr,Nd)-catalyzed reduction of 2-octanone and benzophenone", Journal of Colloid and Interface Science, vol. 281, Oct. 7, 2004, pp. 164-170.
Anwander et al., "Volatile Donor-Functionalized Alkoxy Derivatives of Lutetium and Their Structural Characterization", Inorganic Chemistry, 36, 16, 1997, pp. 3545-3552.
International Search Report, dated Sep. 6, 2022, in International Bureau of Patent Application No. PCT/JP2022/024289 with an English translation thereof.
Written Opinion, dated Sep. 6, 2022, in International Bureau of WIPO Patent Application No. PCT/JP2022/024289 with an English translation thereof.

* cited by examiner

THIN-FILM FORMING RAW MATERIAL, THIN-FILM AND METHOD OF PRODUCING THIN-FILM

TECHNICAL FIELD

The present invention relates to a thin-film forming raw material including an alkoxide compound having a specific structure, a thin-film, and a method of producing a thin-film.

BACKGROUND ART

A thin-film containing a rare earth metal has been used as a member of an electronic part, such as a high dielectric capacitor, a ferroelectric capacitor, a gate insulating film, or a superconducting thin-film, or a member of an optical communication device using optical glass, such as a laser oscillator, an optical fiber, an optical waveguide, an optical amplifier, or an optical switch.

As a method of producing the thin-film, there are given, for example, a sputtering method, an ion plating method, metal-organic decomposition (MOD) methods, such as a coating thermal decomposition method and a sol-gel method, and a chemical vapor deposition (CVD) method.

There are many reports on various raw materials each serving as a supply source of a rare earth metal atom to be used in the CVD method. For example, in Patent Document 1, there is a disclosure of a method of forming an yttrium aluminate thin-film through use of tris(2,2,6,6-tetramethyl-3,5-heptanedionate)yttrium and triethylaluminum. In addition, in Non Patent Document 1, there is a disclosure of alkoxide compounds of lutetium and yttrium that can each be used as a thin-film forming raw material.

CITATION LIST

Patent Document

Patent Document 1: US 2011/0121376 A1

Non Patent Document

Non Patent Document 1: Inorg. Chem. 1997, 36, 16, 3545-3552, "Volatile Donor-Functionalized Alkoxy Derivatives of Lutetium and Their Structural Characterization"

SUMMARY OF INVENTION

Technical Problem

In a method including vaporizing a compound to form a thin-film such as the CVD method, the compound (precursor) to be used as a thin-film forming raw material is required to be able to produce a high-quality thin-film with high productivity. Out of such compounds, a compound to be used as a thin-film forming raw material for an atomic layer deposition method (hereinafter sometimes referred to as "ALD method") is required to have a temperature region applicable to the ALD method, which is called an ALD window. However, the related-art thin-film forming raw material containing a rare earth metal atom has not sufficiently satisfied those properties.

Accordingly, an object of the present invention is to provide a thin-film forming raw material, which can produce a high-quality thin-film containing a rare earth metal atom and having a low residual carbon content with high productivity.

Solution to Problem

The inventors of the present invention have made investigations and found that the above-mentioned problems can be solved by an alkoxide compound having a specific structure to reach the present invention.

That is, according to one embodiment of the present invention, there is provided a thin-film forming raw material, including an alkoxide compound represented by the following general formula (1):

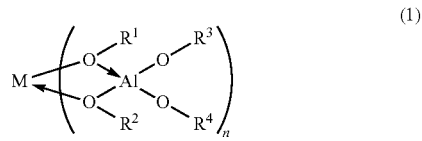

where $R^1$ to $R^4$ each independently represent an alkyl group having 1 to 5 carbon atoms, M represents a rare earth metal atom, and "n" represents a valence of the rare earth metal atom.

According to one embodiment of the present invention, there is provided a thin-film, which is produced by using the thin-film forming raw material.

According to one embodiment of the present invention, there is provided a method of producing a thin-film, including forming a thin-film containing a rare earth metal atom on a surface of a substrate through use of the thin-film forming raw material.

Advantageous Effects of Invention

According to the present invention, the thin-film forming raw material, which can produce a high-quality thin-film containing a rare earth metal atom and having a low residual carbon content with high productivity, can be provided.

DESCRIPTION OF EMBODIMENTS

Figure 1:
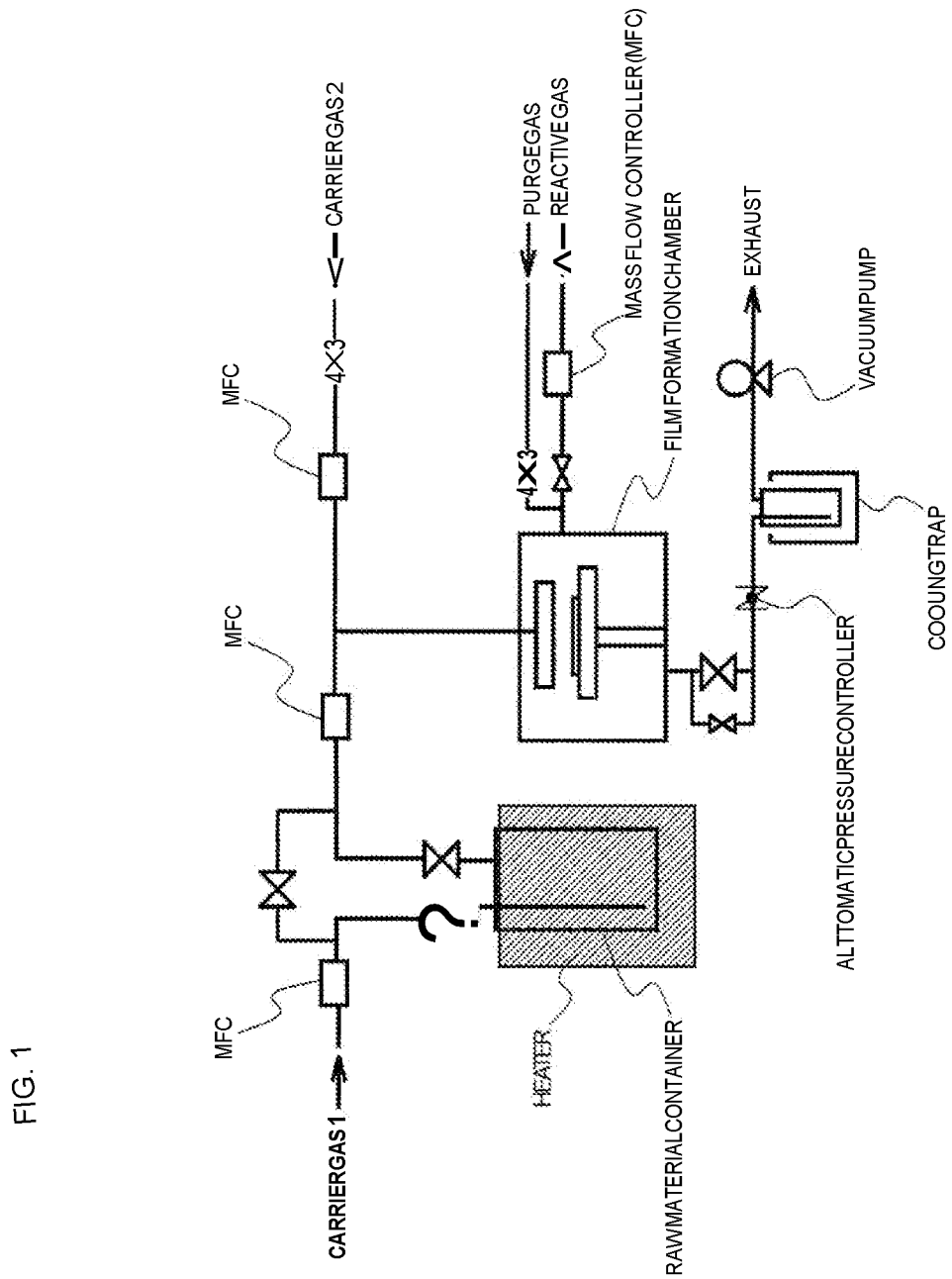
FIG. 1 is a schematic diagram for illustrating an example of an ALD apparatus to be used in a method of producing a thin-film according to the present invention.
Figure 2:
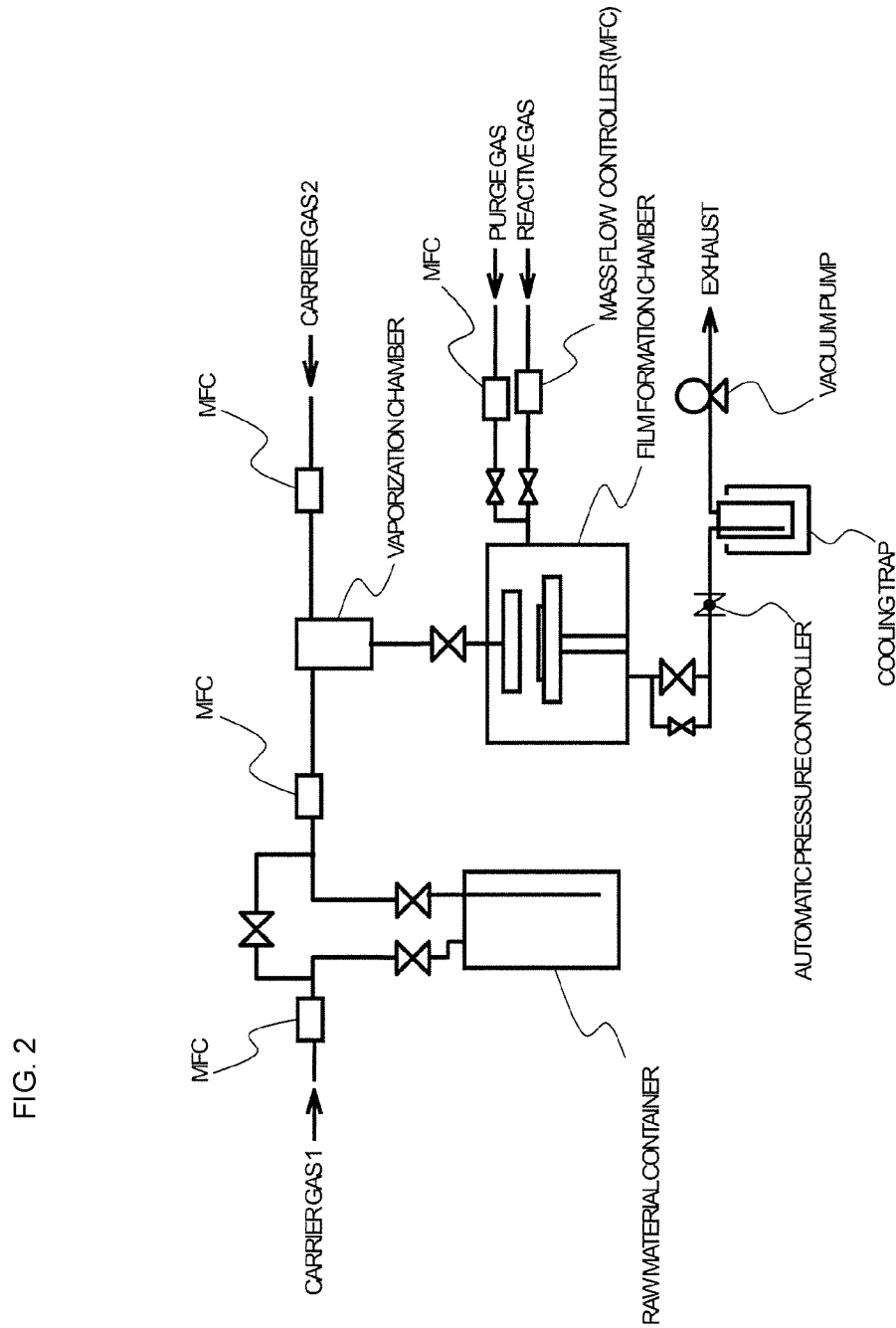
FIG. 2 is a schematic diagram for illustrating another example of the ALD apparatus to be used in the method of producing a thin-film according to the present invention.

A thin-film forming raw material of the present invention includes an alkoxide compound represented by the general formula (1).

In the general formula (1), $R^1$ to $R^4$ each independently represent an alkyl group having 1 to 5 carbon atoms, M represents a rare earth metal atom, and "n" represents a valence of the rare earth metal atom.

Specific examples of the "alkyl group having 1 to 5 carbon atoms" include a methyl group, an ethyl group, a propyl group, an isopropyl group, a butyl group, an isobutyl group, a sec-butyl group, a tert-butyl group, a pentyl group, an isopentyl group, and a neopentyl group.

Specific examples of the "rare earth metal atom" include a scandium atom, an yttrium atom, a lanthanum atom, a cerium atom, a praseodymium atom, a neodymium atom, a promethium atom, a samarium atom, a europium atom, a gadolinium atom, a terbium atom, a dysprosium atom, a holmium atom, an erbium atom, a thulium atom, an ytterbium atom, and a lutetium atom.

In the general formula (1), $R^1$ to $R^4$, M, and "n" are appropriately selected in accordance with a method of producing a thin-film to be used. When the thin-film forming raw material of the present invention is used in a method of producing a thin-film including a step of vaporizing a compound, $R^1$ to $R^4$, M, and "n" are preferably selected so that the compound may have a high vapor pressure and a low melting point.

From the viewpoint of having a low melting point, having high thermal stability, and being able to produce a high-quality thin-film with high productivity when used as a thin-film forming raw material, $R^1$ to $R^4$ each independently represent preferably an alkyl group having 2 to 5 carbon atoms, more preferably an alkyl group having 3 to 5 carbon atoms, still more preferably a secondary alkyl group having 3 to 5 carbon atoms, particularly preferably an isopropyl group or a sec-butyl group, most preferably a sec-butyl group. From the viewpoint of being able to produce a high-quality thin-film with high productivity, it is preferred that $R^1$ to $R^4$ all represent the same group. From the viewpoint of being able to produce a high-quality thin-film with high productivity when used as a thin-film forming raw material, M represents preferably a scandium atom, an yttrium atom, a lanthanum atom, or an erbium atom, more preferably an yttrium atom or an erbium atom. When M represents each of those preferred rare earth metal atoms, "n" represents 3.

In addition, when the thin-film forming raw material is used in a method of producing a thin-film by a MOD method free of any vaporization step, $R^1$ to $R^4$, M, and "n" may each be arbitrarily selected in accordance with, for example, solubility in a solvent to be used and a thin-film formation reaction.

Preferred specific examples of the alkoxide compound represented by the general formula (1) include Compounds No. 1 to No. 24 below. In Compounds No. 1 to No. 24 below, "Me" represents a methyl group, "Et" represents an ethyl group, "iPr" represents an isopropyl group, "iBu" represents an isobutyl group, "sBu" represents a sec-butyl group, and "tBu" represents a tert-butyl group.

No.1
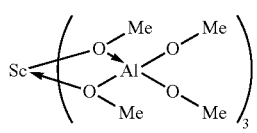

No.2
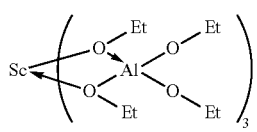

No.3
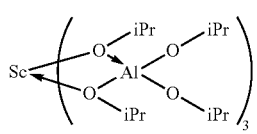

No.4
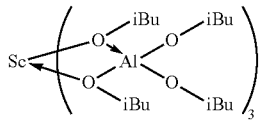

No.5
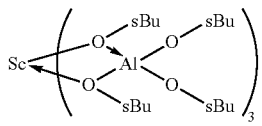

No.6
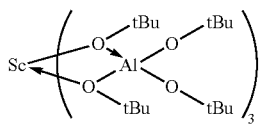

No.7
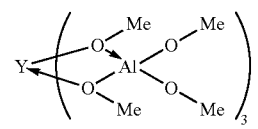

No.8
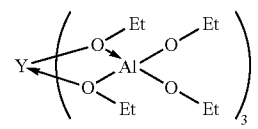

No.9
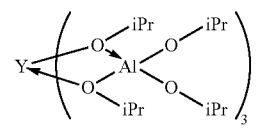

No.10
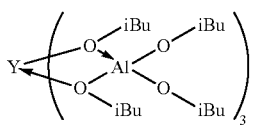

No.11
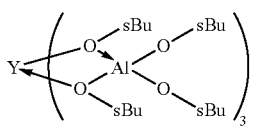

No.12
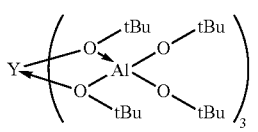

No.13
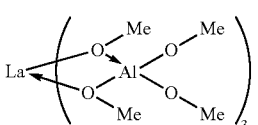

No.14
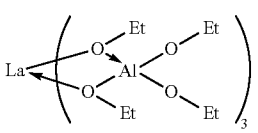

No.15
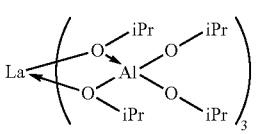

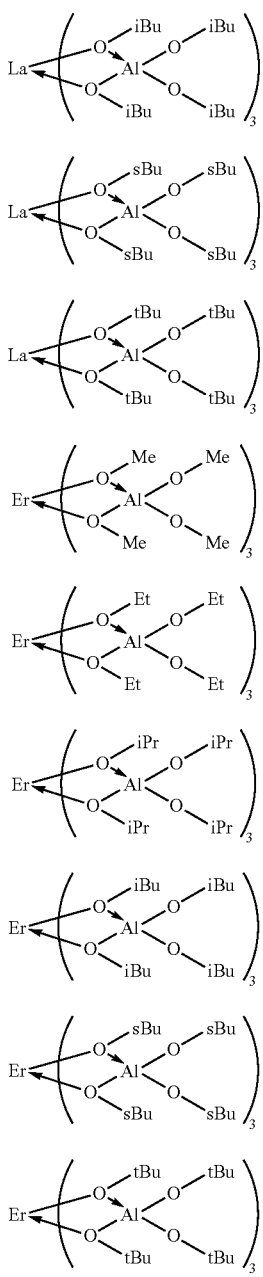

No.16
No.17
No.18
No.19
No.20
No.21
No.22
No.23
No.24

A method of producing the alkoxide compound represented by the general formula (1) is not particularly limited, and a well-known reaction may be applied. For example, an alkoxide compound in which M in the general formula (1) represents an yttrium atom or an erbium atom may be produced by causing an yttrium alkyl alkoxide compound or erbium alkyl alkoxide compound having a corresponding structure and an aluminum alkyl alkoxide compound having a corresponding structure to react with each other under a toluene solvent, followed by removal of the solvent and distillation purification.

The thin-film forming raw material of the present invention includes the alkoxide compound represented by the general formula (1) as a precursor of a thin-film. Its form varies depending on a production process to which the thin-film forming raw material is applied. For example, when a thin-film containing only a rare earth metal atom and an aluminum atom as metals is produced, the thin-film forming raw material of the present invention is free of a metal compound other than the alkoxide compound represented by the general formula (1) and a semimetal compound. Meanwhile, when a thin-film containing three or more kinds of metals and/or a semimetal is produced, the thin-film forming raw material of the present invention may include a compound containing a desired metal and/or a compound containing the semimetal (hereinafter sometimes referred to as "other precursor") in addition to the alkoxide compound represented by the general formula (1). The thin-film forming raw material of the present invention may further include an organic solvent and/or a nucleophilic reagent as described later. As described above, the physical properties of the alkoxide compound represented by the general formula (1) serving as the precursor are suitable for a CVD method, and hence the thin-film forming raw material of the present invention is useful as a chemical vapor deposition raw material (hereinafter sometimes referred to as "CVD raw material"). The thin-film forming raw material of the present invention is particularly suitable for the ALD method out of the CVD methods because the alkoxide compound represented by the general formula (1) has an ALD window. Accordingly, the thin-film forming raw material of the present invention is particularly useful as a thin-film forming raw material for an atomic layer deposition method.

When the thin-film forming raw material of the present invention is a chemical vapor deposition raw material, its form is appropriately selected in accordance with a procedure such as a transportation and supply method of the CVD method to be used.

As the above-mentioned transportation and supply method, there are given a gas transportation method and a liquid transportation method. The gas transportation method involves vaporizing the CVD raw material through heating and/or decompression in a vessel in which the raw material is stored (hereinafter sometimes referred to as "raw material vessel") to provide a raw material gas, and introducing the raw material gas into a film formation chamber (hereinafter sometimes referred to as "deposition reaction portion") having a substrate set therein together with a carrier gas, such as argon, nitrogen, or helium, to be used as required. The liquid transportation method involves transporting the CVD raw material to a vaporization chamber under the state of a liquid or a solution, vaporizing the raw material through heating and/or decompression in the vaporization chamber to provide a raw material gas, and introducing the raw material gas into the film formation chamber. In the case of the gas transportation method, the alkoxide compound represented by the general formula (1) itself may be used as the CVD raw material. In the case of the liquid transportation method, the alkoxide compound represented by the general formula (1) itself or a solution obtained by dissolving the alkoxide compound in an organic solvent may be used as the CVD raw material. The CVD raw material may further include the other precursor, a nucleophilic reagent, and the like.

In addition, in a multi-component CVD method, there are given a method involving vaporizing and supplying the CVD raw material independently for each component (hereinafter sometimes referred to as "single source method"), and a method involving vaporizing and supplying a mixed raw material obtained by mixing a multi-component raw material with desired composition in advance (hereinafter sometimes referred to as "cocktail source method"). In the case of the cocktail source method, a mixture of the alkoxide compound represented by the general formula (1) and the other precursor or a mixed solution obtained by dissolving the mixture in an organic solvent may be used as the CVD raw material. The mixture and the mixed solution may each further contain a nucleophilic reagent and the like.

There is no particular limitation on the above-mentioned organic solvent, and a well-known and general organic solvent may be used. Examples of the organic solvent include: acetic acid esters, such as ethyl acetate, butyl acetate, and methoxyethyl acetate; ethers, such as tetrahydrofuran, tetrahydropyran, ethylene glycol dimethyl ether, diethylene glycol dimethyl ether, triethylene glycol dimethyl ether, dibutyl ether, and dioxane; ketones, such as methyl butyl ketone, methyl isobutyl ketone, ethyl butyl ketone, dipropyl ketone, diisobutyl ketone, methyl amyl ketone, cyclohexanone, and methylcyclohexanone; hydrocarbons, such as hexane, cyclohexane, methylcyclohexane, dimethylcyclohexane, ethylcyclohexane, heptane, octane, toluene, and xylene; hydrocarbons each having a cyano group, such as 1-cyanopropane, 1-cyanobutane, 1-cyanohexane, cyanocyclohexane, cyanobenzene, 1,3-dicyanopropane, 1,4-dicyanobutane, 1,6-dicyanohexane, 1,4-dicyanocyclohexane, and 1,4-dicyanobenzene; and pyridine and lutidine. Those organic solvents may be used alone or as a mixture thereof in accordance with the solubility of a solute, a relationship among the use temperature, boiling point, and flash point of each of the solvents, and the like.

When the thin-film forming raw material of the present invention is a mixed solution with the above-mentioned organic solvent, the amount of the entire precursors in the thin-film forming raw material is preferably from 0.01 mol/liter to 2.0 mol/liter, more preferably from 0.05 mol/liter to 1.0 mol/liter from the viewpoint of being able to produce a thin-film with high productivity.

When the thin-film forming raw material of the present invention is free of a metal compound other than the alkoxide compound represented by the general formula (1) and a semimetal compound, the amount of the entire precursors herein means the amount of the alkoxide compound represented by the general formula (1). When the thin-film forming raw material of the present invention includes a compound containing another metal and/or a compound containing a semimetal (other precursor) in addition to the alkoxide compound represented by the general formula (1), the amount of the entire precursors herein means the total amount of the alkoxide compound represented by the general formula (1) and the other precursor.

In addition, in the case of the multi-component CVD method, there is no particular limitation on the other precursor to be used together with the alkoxide compound represented by the general formula (1), and a well-known and general precursor used in the CVD raw material may be used.

Examples of the above-mentioned other precursor include compounds of one kind or two or more kinds selected from the group consisting of compounds used as organic ligands, such as an alcohol compound, a glycol compound, a ß-diketone compound, a cyclopentadiene compound, and an organic amine compound, and silicon or a metal. Examples of the kind of the metal in the precursor include lithium, sodium, potassium, magnesium, calcium, strontium, barium, titanium, zirconium, hafnium, vanadium, tantalum, chromium, molybdenum, tungsten, manganese, iron, cobalt, rhodium, iridium, nickel, palladium, platinum, copper, silver, gold, zinc, aluminum, germanium, tin, lead, antimony, bismuth, yttrium, lanthanum, cerium, praseodymium, neodymium, promethium, samarium, europium, gadolinium, terbium, dysprosium, holmium, erbium, thulium, ytterbium, ruthenium, and lutetium.

Examples of the alcohol compound to be used as the organic ligand in the above-mentioned other precursor include: alkyl alcohols, such as methanol, ethanol, propanol, isopropyl alcohol, butanol, sec-butyl alcohol, isobutyl alcohol, tert-butyl alcohol, pentyl alcohol, isopentyl alcohol, and tert-pentyl alcohol; ether alcohols, such as 2-methoxyethanol, 2-ethoxyethanol, 2-butoxyethanol, 2-(2-methoxyethoxy)ethanol, 2-methoxy-1-methylethanol, 2-methoxy-1,1-dimethylethanol, 2-ethoxy-1,1-dimethylethanol, 2-isopropoxy-1,1-dimethylethanol, 2-butoxy-1,1-dimethylethanol, 2-(2-methoxyethoxy)-1,1-dimethylethanol, 2-propoxy-1,1-diethylethanol, 2-s-butoxy-1,1-diethylethanol, and 3-methoxy-1,1-dimethylpropanol; and dialkylamino alcohols, such as dimethylaminoethanol, ethylmethylaminoethanol, diethylaminoethanol, dimethylamino-2-pentanol, ethylmethylamino-2-pentanol, dimethylamino-2-methyl-2-pentanol, ethylmethylamino-2-methyl-2-pentanol, and diethylamino-2-methyl-2-pentanol.

Examples of the glycol compound to be used as the organic ligand in the above-mentioned other precursor include 1,2-ethanediol, 1,2-propanediol, 1,3-propanediol, 2,4-hexanediol, 2,2-dimethyl-1,3-propanediol, 2,2-diethyl-1,3-propanediol, 1,3-butanediol, 2,4-butanediol, 2,2-diethyl-1,3-butanediol, 2-ethyl-2-butyl-1,3-propanediol, 2,4-pentanediol, 2-methyl-1,3-propanediol, 2-methyl-2,4-pentanediol, 2,4-hexanediol, and 2,4-dimethyl-2,4-pentanediol.

Examples of the β-diketone compound to be used as the organic ligand in the above-mentioned other precursor include: alkyl-substituted β-diketones, such as acetylacetone, hexane-2,4-dione, 5-methylhexane-2,4-dione, heptane-2,4-dione, 2-methylheptane-3,5-dione, 5-methylheptane-2,4-dione, 6-methylheptane-2,4-dione, 2,2-dimethylheptane-3,5-dione, 2,6-dimethylheptane-3,5-dione, 2,2,6-trimethylheptane-3,5-dione, 2,2,6,6-tetramethylheptane-3,5-dione, octane-2,4-dione, 2,2,6-trimethyloctane-3,5-dione, 2,6-dimethyloctane-3,5-dione, 2,9-dimethylnonane-4,6-dione, 2-methyl-6-ethyldecane-3,5-dione, and 2,2-dimethyl-6-ethyldecane-3,5-dione; fluorine-substituted alkyl β-diketones, such as 1,1,1-trifluoropentane-2,4-dione, 1,1,1-trifluoro-5,5-dimethylhexane-2,4-dione, 1,1,1,5,5,5-hexafluoropentane-2,4-dione, and 1,3-diperfluorohexylpropane-1,3-dione; and ether-substituted ß-diketones, such as 1,1,5,5-tetramethyl-1-methoxyhexane-2,4-dione, 2,2,6,6-tetramethyl-1-methoxyheptane-3,5-dione, and 2,2,6,6-tetramethyl-1-(2-methoxyethoxy)heptane-3,5-dione.

Examples of the cyclopentadiene compound to be used as the organic ligand in the above-mentioned other precursor include cyclopentadiene, methylcyclopentadiene, ethylcyclopentadiene, propylcyclopentadiene, isopropylcyclopentadiene, butylcyclopentadiene, sec-butylcyclopentadiene, isobutylcyclopentadiene, tert-butylcyclopentadiene, dimethylcyclopentadiene, and tetramethylcyclopentadiene.

Examples of the organic amine compound to be used as the organic ligand in the above-mentioned other precursor include methylamine, ethylamine, propylamine, isopropylamine, butylamine, sec-butylamine, tert-butylamine, isobutylamine, dimethylamine, diethylamine, dipropylamine, diisopropylamine, ethylmethylamine, propylmethylamine, and isopropylmethylamine.

The above-mentioned other precursors are known in the art, and production methods therefor are also known. An example of the production methods is given below. For example, when the alcohol compound is used as the organic ligand, the precursor may be produced through a reaction between an inorganic salt of the metal described above or a hydrate thereof and an alkali metal alkoxide of the alcohol compound. In this case, examples of the inorganic salt of the metal or the hydrate thereof may include a halide and a nitrate of the metal, and examples of the alkali metal alkoxide may include a sodium alkoxide, a lithium alkoxide, and a potassium alkoxide.

In the case of the single source method, a compound similar to the alkoxide compound represented by the general formula (1) in the behavior of thermal decomposition and/or oxidative decomposition is preferably used as the above-mentioned other precursor. In the case of the cocktail source method, a compound that not only is similar to the alkoxide compound represented by the general formula (1) in the behavior of thermal decomposition and/or oxidative decomposition but also does not cause any change impairing desired characteristics as a precursor through a chemical reaction or the like at the time of mixing is preferably used as the above-mentioned other precursor because a high-quality thin-film can be produced with high productivity.

In addition, the thin-film forming raw material of the present invention may include a nucleophilic reagent as required in order to impart the stability of each of the alkoxide compound represented by the general formula (1) and the other precursor. Examples of the nucleophilic reagent include: ethylene glycol ethers, such as glyme, diglyme, triglyme, and tetraglyme; crown ethers, such as 18-crown-6, dicyclohexyl-18-crown-6,24-crown-8, dicyclohexyl-24-crown-8, and dibenzo-24-crown-8; polyamines, such as ethylenediamine, N, N'-tetramethylethylenediamine, diethylenetriamine, triethylenetetramine, tetraethylenepentamine, pentaethylenehexamine, 1,1,4,7,7-pentamethyldiethylenetriamine, 1,1,4,7,10,10-hexamethyltriethylenetetramine, and triethoxytriethyleneamine; cyclic polyamines, such as cyclam and cyclen; heterocyclic compounds, such as pyridine, pyrrolidine, piperidine, morpholine, N-methylpyrrolidine, N-methylpiperidine, N-methylmorpholine, tetrahydrofuran, tetrahydropyran, 1,4-dioxane, oxazole, thiazole, and oxathiolane; β-keto esters, such as methyl acetoacetate, ethyl acetoacetate, and 2-methoxyethyl acetoacetate; and β-diketones, such as acetylacetone, 2,4-hexanedione, 2,4-heptanedione, 3,5-heptanedione, and dipivaloylmethane. The usage amount of the nucleophilic reagent is preferably from 0.1 mol to 10 mol, more preferably from 1 mol to 4 mol with respect to 1 mol of the amount of the entire precursors from the viewpoint of being able to produce a high-quality thin-film with high productivity.

The thin-film forming raw material of the present invention is prevented from containing impurity metal elements except the components for forming the raw material, impurity halogens such as impurity chlorine, and impurity organic substances to the extent possible. The content of each of the impurity metal elements is preferably 100 ppb or less, more preferably 10 ppb or less, and the total content thereof is preferably 1 ppm or less, more preferably 100 ppb or less from the viewpoint of being able to produce a high-quality thin-film with high productivity. In particular, when the thin-film forming raw material is used as the gate insulating film, gate film, or barrier layer of an LSI, the contents of an alkali metal element and an alkaline-earth metal element that influence the electrical characteristics of a thin-film to be obtained need to be reduced. The content of the impurity halogens is preferably 100 ppm or less, more preferably 10 ppm or less, most preferably 1 ppm or less from the viewpoint of being able to produce a high-quality thin-film with high productivity. The total content of the impurity organic substances is preferably 500 ppm or less, more preferably 50 ppm or less, most preferably 10 ppm or less from the viewpoint of being able to produce a high-quality thin-film with high productivity. In addition, moisture causes generation of particles in the chemical vapor deposition raw material and generation of particles during thin-film formation. Accordingly, moisture in each of the precursor, the organic solvent, and the nucleophilic reagent is preferably removed as much as possible before its use. The moisture content of each of the precursor, the organic solvent, and the nucleophilic reagent is preferably 10 ppm or less, more preferably 1 ppm or less.

In addition, it is preferred that the thin-film forming raw material of the present invention be prevented from containing particles to the extent possible in order to reduce or prevent particle contamination of a thin-film to be formed. Specifically, in particle measurement with a light scattering liquid particle detector in a liquid phase, it is preferred that the number of particles larger than 0.3 μm be 100 or less in 1 mL of the liquid phase, it is more preferred that the number of particles larger than 0.2 μm be 1,000 or less in 1 mL of the liquid phase, and it is most preferred that the number of particles larger than 0.2 μm be 100 or less in 1 mL of the liquid phase.

Next, a method of producing a thin-film including using the thin-film forming raw material of the present invention is described. The method of producing a thin-film of the present invention includes forming a thin-film containing a rare earth metal atom on the surface of a substrate through use of the above-mentioned thin-film forming raw material of the present invention. Specifically, the method includes forming the thin-film containing a rare earth metal atom on the surface of the substrate through use of a raw material gas obtained by vaporizing the thin-film forming raw material of the present invention. It is preferred that the method of producing a thin film of the present invention include: a raw material introduction step of introducing a raw material gas obtained by vaporizing the above-mentioned thin-film forming raw material into a film formation chamber having set therein the substrate; and a thin-film formation step of subjecting the alkoxide compound represented by the general formula (1) in the raw material gas to decomposition and/or a chemical reaction, to thereby form the thin-film containing a rare earth metal atom on the surface of the substrate. Specifically, the method is more preferably a CVD method including: introducing the raw material gas obtained by vaporizing the thin-film forming raw material of the present invention and a reactive gas to be used as required into the film formation chamber (treatment atmosphere) having the substrate set therein; and then subjecting a precursor in the raw material gas to decomposition and/or a chemical reaction on the substrate, to thereby grow and deposit the thin-film containing a rare earth metal atom on the surface of the substrate. A transportation and supply method for the raw material, a deposition method therefor, production conditions, a production apparatus, and the like are not particularly limited, and well-known and general conditions and methods may be used.

Examples of the above-mentioned reactive gas to be used as required include: oxidizing gases, such as oxygen, ozone, and water vapor, reducing gases, such as a hydrocarbon compound, for example, methane or ethane, hydrogen, carbon monoxide, and an organic metal compound; and nitriding gases, such as an organic amine compound, for example, a monoalkylamine, a dialkylamine, a trialkylamine, or an alkylenediamine, hydrazine, and ammonia. Those reactive gases may be used alone or as a mixture thereof. The alkoxide compound represented by the general formula (1) has such a property as to satisfactorily react with the oxidizing gas, and has such a property as to more satisfactorily react with ozone out of the oxidizing gases. Accordingly, the oxidizing gas is preferably used as the reactive gas, and ozone is particularly preferably used.

In addition, examples of the above-mentioned transportation and supply method include the gas transportation method, the liquid transportation method, the single source method, and the cocktail source method described above.

In addition, examples of the above-mentioned deposition method include: a thermal CVD method including causing a raw material gas or the raw material gas and a reactive gas to react only with heat, to thereby deposit a thin-film; a plasma CVD method using heat and plasma; an optical CVD method using heat and light; an optical plasma CVD method using heat, light, and plasma; and an ALD method including dividing a deposition reaction of a CVD method into elementary steps, and performing deposition at a molecular level in a stepwise manner.

Examples of a material for the above-mentioned substrate include: silicon; ceramics, such as silicon nitride, titanium nitride, tantalum nitride, titanium oxide, ruthenium oxide, zirconium oxide, hafnium oxide, and lanthanum oxide; glass; and metals such as metal cobalt. Examples of the shape of the substrate include a plate shape, a spherical shape, a fibrous shape, and a scaly shape. The surface of the substrate may be planar, or may have a three-dimensional structure such as a trench structure.

In addition, examples of the above-mentioned production conditions include a reaction temperature (substrate temperature), a reaction pressure, and a deposition rate. The reaction temperature is preferably from room temperature to 500° C., more preferably from 200° C. to 500° C. from the viewpoint of being able to produce a high-quality thin-film with high productivity. In addition, the reaction pressure is preferably from 10 Pa to an atmospheric pressure in the case of the thermal CVD method or the optical CVD method, and is preferably from 10 Pa to 2,000 Pa in the case of using plasma from the viewpoint of being able to produce a high-quality thin-film with high productivity.

In addition, the deposition rate may be controlled by the supply conditions (vaporization temperature and vaporization pressure) of the raw material, the reaction temperature, and the reaction pressure. When the deposition rate is high, the characteristics of a thin-film to be obtained may deteriorate. When the deposition rate is low, a problem may occur in productivity. Accordingly, the deposition rate is preferably from 0.01 nm/min to 100 nm/min, more preferably from 0.1 nm/min to 50 nm/min. In addition, in the case of the ALD method, the deposition rate is controlled by the number of cycles so that a desired film thickness may be obtained.

Further, examples of the above-mentioned production conditions include a temperature and a pressure at the time of the vaporization of the thin-film forming raw material to provide the raw material gas. The step of vaporizing the thin-film forming raw material to provide the raw material gas may be performed in the raw material vessel or in the vaporization chamber. In any case, it is preferred that the thin-film forming raw material of the present invention be vaporized at from 0° C. to 150° C. In addition, when the thin-film forming raw material is vaporized in the raw material vessel or in the vaporization chamber to provide the raw material gas, the pressure in the raw material vessel and the pressure in the vaporization chamber are each preferably from 1 Pa to 10,000 Pa from the viewpoint of being able to produce a high-quality thin-film with high productivity.

The method of producing a thin-film of the present invention is preferably a method including adopting the ALD method out of the CVD methods. When the ALD method is adopted in the method of producing a thin-film of the present invention, it is preferred that the method of producing a thin-film of the present invention further include, between the raw material introduction step and the thin-film formation step, a precursor thin-film formation step of causing the thin-film forming raw material to be adsorbed to the surface of the substrate, to thereby form a precursor thin-film, and the thin-film formation step be a step of causing the precursor thin-film to react with a reactive gas, to thereby form the thin-film containing a rare earth metal atom on the surface of the substrate. Further, the method of producing a thin-film more preferably includes an evacuation step of evacuating an unreacted compound gas.

The respective steps of the above-mentioned ALD method are described in detail below by taking a case in which an yttrium aluminate thin-film (yttrium-aluminum oxide thin-film) is formed as an example. First, the above-mentioned raw material introduction step is performed. A preferred temperature and a preferred pressure when the thin-film forming raw material is turned into the raw material gas are the same as those described in the method of producing a thin-film by the CVD method. When the raw material gas introduced into the film formation chamber and the surface of the substrate are brought into contact with each other, the precursor thin-film is formed on the surface of the substrate (precursor thin-film formation step).

In the above-mentioned precursor thin-film formation step, heat may be applied by heating the substrate or by heating the film formation chamber. The temperature of the substrate in this case is preferably from room temperature to 500° C., more preferably from 200° C. to 500° C. An ALD window in the case of using the thin-film forming raw material of the present invention and the reactive gas in combination falls within the range of approximately from 275° C. to 350° C., preferably from 275° C. to 300° C. The pressure of a system (the inside of the film formation chamber) when this step is performed is preferably from 1 Pa to 10,000 Pa, more preferably from 10 Pa to 1,000 Pa. When the thin-film forming raw material includes the other precursor except the alkoxide compound of the present invention, the other precursor is also deposited on the surface of the substrate together with the alkoxide compound.

Next, the vapor of the thin-film forming raw material that has not been deposited on the surface of the substrate is evacuated from the film formation chamber (evacuation step). Although it is ideal that the vapor of the thin-film forming raw material that has not been deposited and a by-product gas be completely evacuated from the film formation chamber, it is not always required that the vapor and the gas be completely evacuated. A method for the evacuation is, for example, a method including purging the inside of the system with an inert gas, such as nitrogen, helium, or argon, a method including decompressing the inside of the system to evacuate the gas, or a combination of these methods. The degree of decompression when the decompression is performed is preferably from 0.01 Pa to 300 Pa, more preferably from 0.01 Pa to 100 Pa from the viewpoint of being able to produce a high-quality thin-film with high productivity.

Next, an oxidizing gas is introduced as the reactive gas into the film formation chamber, and the yttrium aluminate thin-film is formed from the precursor thin-film obtained in the precursor thin-film formation step through the action of the oxidizing gas or the action of the oxidizing gas and heat (thin-film formation step). A temperature when the heat is applied in this step is preferably from room temperature to 500° C., more preferably from 200° C. to 500° C. from the viewpoint of being able to produce a high-quality thin-film with high productivity. The pressure of the system (inside of the film formation chamber) when this step is performed is preferably from 1 Pa to 10,000 Pa, more preferably from 10 Pa to 1,000 Pa from the viewpoint of being able to produce a high-quality thin-film with high productivity. The alkoxide compound represented by the general formula (1) has satisfactory reactivity with the oxidizing gas, and hence a high-quality yttrium aluminate thin-film having a low residual carbon content can be obtained.

In the case where the ALD method is adopted in the method of producing a thin-film of the present invention as described above, the following may be performed: thin-film deposition by a series of operations consisting of the raw material introduction step, the precursor thin-film formation step, the evacuation step, and the thin-film formation step described above is defined as one cycle; and the cycle is repeated a plurality of times until a thin-film having a required thickness is obtained. In this case, the following is preferably performed: after the thin-film formation step, the unreacted reactive gas and the by-product gas are evacuated from the film formation chamber in the same manner as in the above-mentioned evacuation step, and then the next one cycle is performed.

In addition, in the production of the yttrium aluminate thin-film by the ALD method, energy, such as plasma, light, or a voltage, may be applied, and a catalyst may be used. There are no particular limitations on the timing of the application of the energy and the timing of the use of the catalyst. The energy may be applied or the catalyst may be used, for example, at the time of the introduction of the raw material gas in the raw material introduction step, at the time of heating in the precursor thin-film formation step or the thin-film formation step, at the time of the evacuation of the inside of the system in the evacuation step, or at the time of the introduction of the reactive gas in the thin-film formation step, or between the above-mentioned respective steps.

In addition, in the method of producing a thin-film of the present invention, after the thin-film formation, annealing treatment may be performed under an inert atmosphere, an oxidizing atmosphere, or a reducing atmosphere in order to obtain a thin-film having more satisfactory electrical characteristics. In the case where step embedding is required, a reflow step may be provided. The temperature in this case is from 200° C. to 1,000° C., preferably from 250° C. to 500° C.

Figure 3:
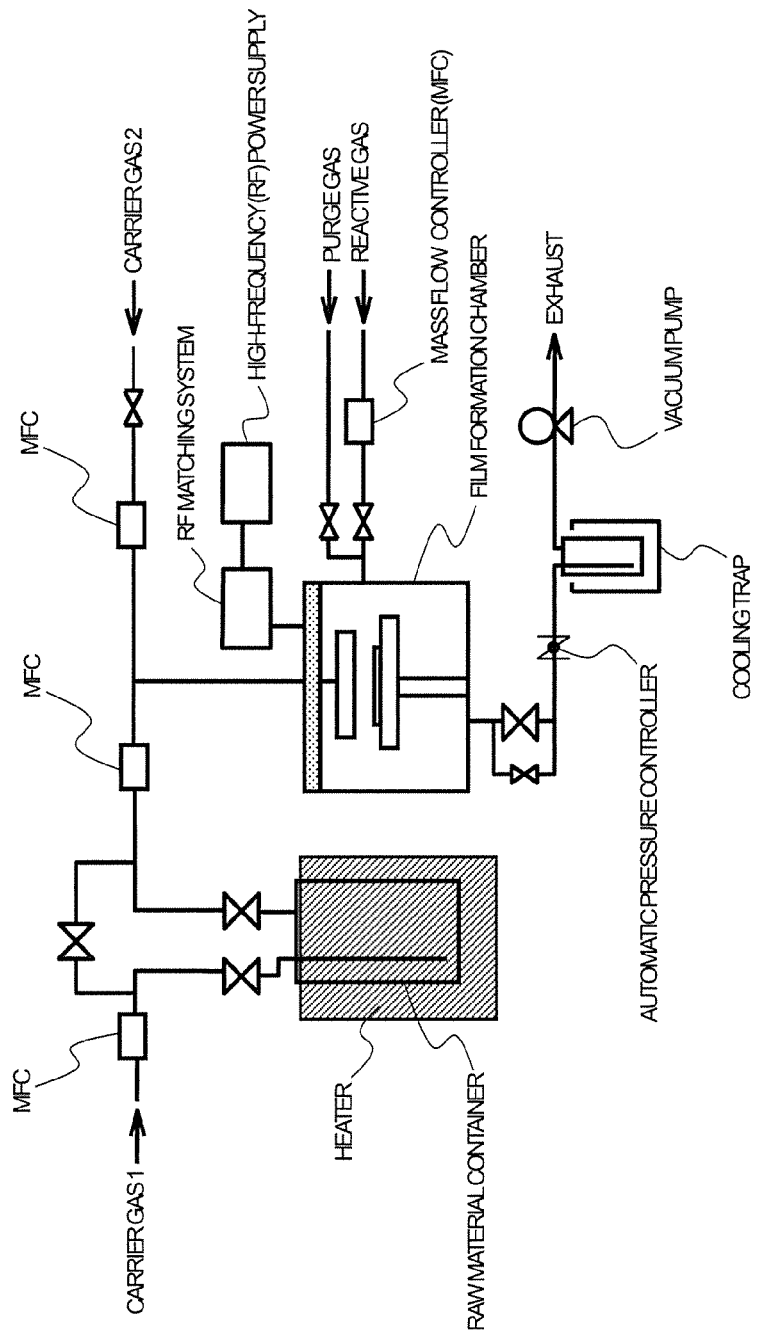
FIG. 3 is a schematic diagram for illustrating still another example of the ALD apparatus to be used in the method of producing a thin-film according to the present invention.
Figure 4:
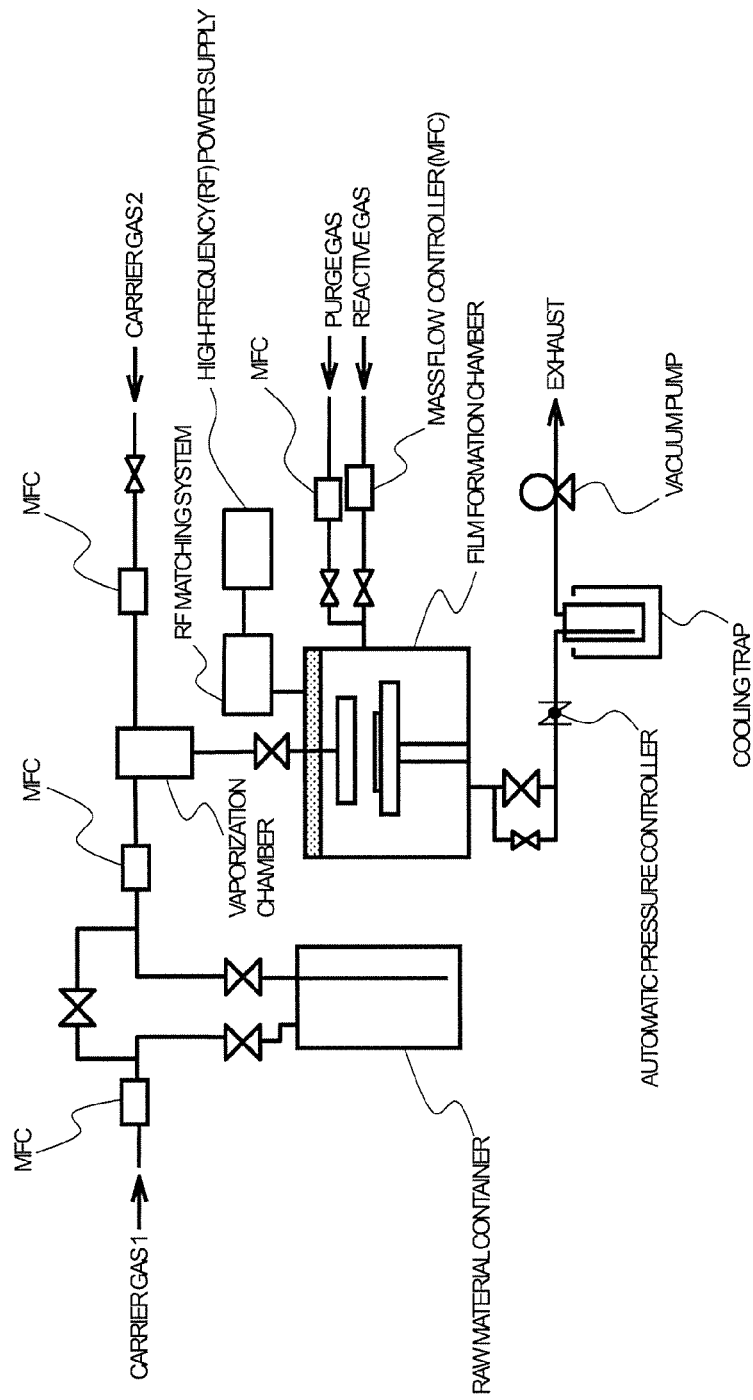
FIG. 4 is a schematic diagram for illustrating still another example of the ALD apparatus to be used in the method of producing a thin-film according to the present invention.

A well-known ALD apparatus may be used in the method of producing a thin-film of the present invention. Specific examples of the ALD apparatus include such an apparatus capable of performing bubbling supply of a precursor as illustrated in each of FIG. 1 and FIG. 3, and such an apparatus including a vaporization chamber as illustrated in each of FIG. 2 and FIG. 4. Such an apparatus capable of subjecting the reactive gas to plasma treatment as illustrated in each of FIG. 3 and FIG. 4 is also permitted. The apparatus is not limited to such single-substrate type apparatus each including a film formation chamber as illustrated in FIG. 1 to FIG. 4, and an apparatus capable of simultaneously processing a large number of substrates through use of a batch furnace may be used. Those ALD apparatus may also be used as CVD apparatus.

A thin-film produced by using the thin-film forming raw material of the present invention may be formed as desired kinds of thin-films, such as thin-films of a metal, oxide ceramics, nitride ceramics, and glass, by appropriately selecting the other precursor, the reactive gas, and the production conditions. It has been known that the thin-film exhibits electrical characteristics, optical characteristics, and the like. Thus, the thin-film has been applied to various uses. Examples thereof include a metal thin-film, a metal oxide thin-film, a metal nitride thin-film, an alloy thin-film, and a metal-containing composite oxide thin-film. Those thin-films have been widely used in the production of, for example, an electrode material for a memory element typified by a DRAM element, a resistance film, a diamagnetic film used for the recording layer of a hard disk, and a catalyst material for a polymer electrolyte fuel cell.

Others

In this disclosure, the following aspects are given.

[1] A thin-film forming raw material, including an alkoxide compound represented by the following general formula (1):

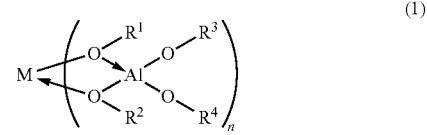

where $R^1$ to $R^4$ each independently represent an alkyl group having 1 to 5 carbon atoms, M represents a rare earth metal atom, and "n" represents a valence of the rare earth metal atom.

[2] The thin-film forming raw material according to Item [1], wherein M represents an yttrium atom or an erbium atom.

[3] The thin-film forming raw material according to Item [1] or [2], wherein $R^1$ to $R^4$ each independently represent an isopropyl group or a sec-butyl group.

[4] The thin-film forming raw material according to any one of Items [1] to [3], wherein the thin-film forming raw material is a thin-film forming raw material for an atomic layer deposition method.

[5] A thin-film, which is produced by using the thin-film forming raw material of any one of Items [1] to [4].

[6] A method of producing a thin-film, including forming a thin-film containing a rare earth metal atom on a surface of a substrate through use of the thin-film forming raw material of any one of Items [1] to [4].

[7] The method of producing a thin-film according to Item [6], wherein the method includes:

a raw material introduction step of introducing a raw material gas obtained by vaporizing the thin-film forming raw material into a film formation chamber having set therein the substrate; and a thin-film formation step of subjecting the alkoxide compound represented by the general formula (1) in the raw material gas to decomposition and/or a chemical reaction, to thereby form the thin-film containing a rare earth metal atom on the surface of the substrate.

[8] The method of producing a thin-film according to Item [7], wherein the method further includes, between the raw material introduction step and the thin-film formation step, a precursor thin-film formation step of causing the thin-film forming raw material to be adsorbed to the surface of the substrate, to thereby form a precursor thin-film, and wherein the thin-film formation step is a step of causing the precursor thin-film to react with a reactive gas, to thereby form the thin-film containing a rare earth metal atom on the surface of the substrate.

EXAMPLES

The present invention is described in more detail below by way of Examples, Comparative Examples, and Evaluation Examples. However, the present invention is by no means limited by Examples and the like below.

[Example 1] Production of Compound No. 9

20.8 Grams (0.0779 mol) of Y(OiPr)$_3$ and 93.8 g of toluene were loaded into a 500 mL four-necked flask under an Ar atmosphere, followed by stirring at room temperature. A solution prepared from 47.7 g (0.234 mol) of Al(OiPr)$_3$ and 13.8 g of toluene was dropped thereinto at room temperature. After the dropping, the mixture was heated at a bath temperature of 120° C. for 28 hours. After that, the solvent was removed, and the residue was distilled at a bath temperature of 196° C., a pressure of 19 Pa, and a column top temperature of 190° C. Thus, 38.5 g of Compound No. 9 was obtained (yield: 56%).
(Analysis Values)
(1) Normal Pressure TG-DTA
  50% mass loss temperature: 291° C. (Ar flow rate: 100 ml/min, temperature increase at 10° C./min, sample amount: 9.964 mg)
(2) Reduced Pressure TG-DTA
  50% mass loss temperature: 204° C. (10 Torr, Ar flow rate: 50 ml/min, temperature increase at 10° C./min, sample amount: 9.991 mg)
(3) Elemental Analysis (Metal Analysis: ICP-AES)
  Yttrium content: 10.6 mass % (theoretical value: 10.12 mass %)
  Aluminum content: 8.76 mass % (theoretical value: 9.21 mass %)
(4) $^1$H-NMR (Solvent: Deuterated Benzene) (Chemical Shift: Multiplicity: Number of Hs)
  (1.240-1.694: multiplet: 72) (4.357-4.448: septet: 12)

[Example 2] Production of Compound No. 11

0.45 Gram (1.45 mmol) of Y(OsBu)$_3$ and 13.38 g of toluene were loaded into a 100 mL three-necked flask under an Ar atmosphere, followed by stirring at room temperature. A solution prepared from 1.07 g (4.36 mmol) of Al(OsBu)$_3$ and 13.38 g of toluene was dropped thereinto at room temperature. After the dropping, the mixture was heated at a bath temperature of 110° C. for 5 hours. After that, the solvent was removed, and the residue (pale yellow solid) was loaded into a flask, which was connected to a Kugelrohr purification apparatus. The residue was distilled at a heating temperature of 235° C. and 70 Pa. Thus, 0.01 g of Compound No. 11 was obtained (yield: 1%).
(Analysis Values)
(1) Normal Pressure TG-DTA
  50% mass loss temperature: 288° C. (Ar flow rate: 100 ml/min, temperature increase at 10° C./min, sample amount: 3.066 mg)
(2) Reduced Pressure TG-DTA
  50% mass loss temperature: 239° C. (10 Torr, Ar flow rate: 50 ml/min, temperature increase at 10° C./min, sample amount: 4.564 mg)
(3) Elemental Analysis (Metal Analysis: ICP-AES)
  Yttrium content: 8.62 mass % (theoretical value: 8.49 mass %)
  Aluminum content: 7.59 mass % (theoretical value: 7.73 mass %)
(4) $^1$H-NMR (Solvent: Deuterated Benzene) (Chemical Shift: Multiplicity: Number of Hs)
  (0.743-1.025: multiplet: 36) (1.165-2.439: multiplet: 60) (3.805-4.179: multiplet: 12)

[Example 3] Production of Compound No. 21

0.72 Gram (2.09 mmol) of Er(OiPr)$_3$ and 1.93 g of toluene were loaded into a 100 mL three-necked flask under an Ar atmosphere, followed by stirring at room temperature. A solution prepared from 1.28 g (6.27 mmol) of Al(OiPr)$_3$ and 1.93 g of toluene was dropped thereinto at room temperature. After the dropping, the mixture was heated at a bath temperature of 115° C. for 9 hours. After that, the solvent was removed, and the residue (pink solid) was loaded into a flask, which was connected to a Kugelrohr purification apparatus. The residue was distilled at a heating temperature of 202° C. and 28 Pa. Thus, 0.83 g of Compound No. 21 was obtained (yield: 42%).
(Analysis Values)
(1) Normal Pressure TG-DTA
  50% mass loss temperature: 286° C. (Ar flow rate: 100 ml/min, temperature increase at 10° C./min, sample amount: 9.887 mg)
(2) Reduced Pressure TG-DTA
  50% mass loss temperature: 201° C. (10 Torr, Ar flow rate: 50 ml/min, temperature increase at 10° C./min, sample amount: 10.148 mg)
(3) Elemental Analysis (Metal Analysis: ICP-AES)
  Erbium content: 17.92 mass % (theoretical value: 17.47 mass %)
  Aluminum content: 8.11 mass % (theoretical value: 8.46 mass %)

[Example 4] Production of Compound No. 23

0.69 Gram (1.78 mmol) of Er(OsBu)$_3$ and 1.64 g of toluene were loaded into a 100 mL three-necked flask under an Ar atmosphere, followed by stirring at room temperature. A solution prepared from 1.32 g (5.34 mmol) of Al(OsBu)$_3$ and 1.64 g of toluene was dropped thereinto at room temperature. After the dropping, the mixture was heated at a bath temperature of 115° C. for 6 hours. After that, the solvent was removed, and the residue (pink solid) was loaded into a flask, which was connected to a Kugelrohr purification apparatus. The residue was distilled at a heating temperature of 230° C. and 23 Pa. Thus, 0.70 g of Compound No. 23 was obtained (yield: 35%).
(Analysis Values)
(1) Normal Pressure TG-DTA
  50% mass loss temperature: 305° C. (Ar flow rate: 100 ml/min, temperature increase at 10° C./min, sample amount: 10.055 mg)
(2) Reduced Pressure TG-DTA
  50% mass loss temperature: 242° C. (10 Torr, Ar flow rate: 50 ml/min, temperature increase at 10° C./min, sample amount: 10.284 mg)

(3) Elemental Analysis (Metal Analysis: ICP-AES)

Erbium content: 16.1 mass % (theoretical value: 14.86 mass %)

Aluminum content: 6.72 mass % (theoretical value: 7.19 mass %)

Evaluation Examples

Compound No. 9, Compound No. 11, Compound No. 21, and Compound No. 23 obtained in Examples 1 to 4, and Comparative Compound 1 described below were each subjected to the following evaluations. Comparative Compound 2 described below was subjected to the melting point evaluation.

(1) Melting Point Evaluation

The state of each of the compounds at 25° C. was visually observed. When the compound was a solid at 25° C., its melting point was measured with a minute melting point-measuring device. It can be judged that a compound having a low melting point is excellent in transportability, and is hence preferred as a thin-film forming raw material. The results are shown in Table 1.

(2) Thermal Stability Evaluation

The thermal decomposition start temperature of each of the compounds was measured with a DSC measuring device. It can be judged that the thermal decomposition of a compound having a high thermal decomposition start temperature hardly occurs, and hence the compound is preferred as a thin-film forming raw material, in particular, a thin-film forming raw material for an atomic layer deposition method. The results are shown in Table 1.

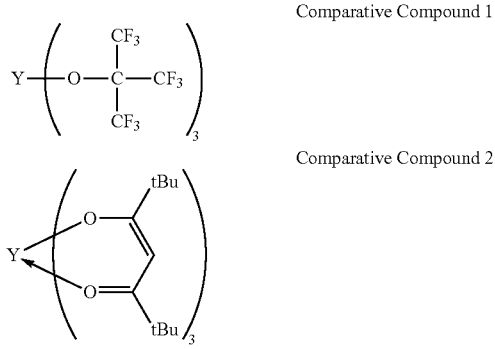

Comparative Compound 1

Comparative Compound 2

TABLE 1

|  | Compound | State at 25° C. | Melting point [° C.] | Thermal decomposition start temperature [° C.] |
|---|---|---|---|---|
| Evaluation Example 1 | Compound No. 9 | Solid | 111 | 347 |
| Evaluation Example 2 | Compound No. 11 | Solid | 112 | 340 |
| Evaluation Example 3 | Compound No. 21 | Solid | 116 | 347 |
| Evaluation Example 4 | Compound No. 23 | Solid | 117 | 337 |
| Comparative Evaluation Example 1 | Comparative Compound 1 | Solid | 183 | 225 |
| Comparative Evaluation Example 2 | Comparative Compound 2 | Solid | 171 | Unmeasured |

As shown in Table 1 above, it was found that, while Comparative Compound 1 and Comparative Compound 2 each had a melting point of 170° C. or more, Compound No. 9, Compound No. 11, Compound No. 21, and Compound No. 23 obtained in Examples 1 to 4 each had a melting point of less than 120° C. In addition, it was found that Compound No. 9, Compound No. 11, Compound No. 21, and Compound No. 23 obtained in Examples 1 to 4 each had a higher thermal decomposition start temperature than Comparative Compound 1 by 110° C. or more. It was found that Compound No. 9 and Compound No. 21 out of those compounds each had a higher thermal decomposition start temperature than Comparative Compound 1 even by 120° C. or more.

<Production of Thin-Film by ALD Method>

A thin-film was produced on a silicon substrate with an apparatus illustrated in FIG. 1 by an ALD method under the following conditions by using each of Compound No. 9, Compound No. 11, Compound No. 21, and Compound No. 23 obtained in Examples 1 to 4, and Comparative Compound 1 and Comparative Compound 2 as a chemical vapor deposition raw material. The measurement of the thickness of the resultant thin-film by an X-ray reflectivity method, the identification of the compound thereof by an X-ray diffraction method, and the measurement of a residual carbon content therein by X-ray photoelectron spectroscopy were performed. The results are shown in Table 2.

[Examples 5 and 7] Production of Thin-Film by ALD Method (Conditions)

Reaction temperature (substrate temperature): 300° C., reactive gas: ozone (Steps)

A series of steps consisting of the following steps (1) to (4) was defined as one cycle, and the cycle was repeated 50 times:

(1) the vapor (raw material gas) of the chemical vapor deposition raw material vaporized under the conditions of a raw material vessel heating temperature of 160° C. and a raw material vessel internal pressure of 100 Pa is introduced into a film formation chamber, and the raw material gas is adsorbed to the surface of the silicon substrate at a system pressure of 100 Pa for 10 seconds, to thereby form a precursor thin-film (precursor thin-film formation step);

(2) the raw material gas not having been adsorbed is evacuated from the system through argon purging for 15 seconds (evacuation step);

(3) the reactive gas is introduced into the film formation chamber, and the precursor thin-film and the reactive gas are caused to react with each other at a system pressure of 100 Pa for 20 seconds (thin-film formation step); and (4) the unreacted reactive gas and a by-product gas are evacuated from the system through argon purging for 30 seconds (evacuation step).

[Examples 6 and 8] Production of Thin-Film by ALD Method (Conditions)

Reaction temperature (substrate temperature): 300° C., reactive gas: ozone (Steps)

A series of steps consisting of the following steps (1) to (4) was defined as one cycle, and the cycle was repeated 50 times:

(1) the vapor (raw material gas) of the chemical vapor deposition raw material vaporized under the conditions of a raw material vessel heating temperature of 180° C. and a raw material vessel internal pressure of 100 Pa is introduced into a film formation chamber, and the raw material gas is adsorbed to the surface of the silicon substrate at a system pressure of 100 Pa for 10 seconds, to thereby form a precursor thin-film (precursor thin-film formation step);

(2) the raw material gas not having been adsorbed is evacuated from the system through argon purging for 15 seconds (evacuation step);

(3) the reactive gas is introduced into the film formation chamber, and the precursor thin-film and the reactive gas are caused to react with each other at a system pressure of 100 Pa for 20 seconds (thin-film formation step); and (4) the unreacted reactive gas and a by-product gas are evacuated from the system through argon purging for 30 seconds (evacuation step).

[Comparative Example 1] Production of Thin-Film by ALD Method (Conditions)

Reaction temperature (substrate temperature): 300° C., reactive gas: ozone

A series of steps consisting of the following steps (1) to (8) was defined as one cycle, and the cycle was repeated 50 times:

(1) the vapor of the chemical vapor deposition raw material vaporized under the conditions of a raw material vessel temperature of 90° C. and a raw material vessel internal pressure of 100 Pa is introduced into a film formation chamber, and the chemical vapor deposition raw material is deposited on the surface of the silicon substrate at a system pressure of 100 Pa for 10 seconds;

(2) the vapor of the chemical vapor deposition raw material not having been deposited is evacuated from the system through argon purging for 15 seconds;

(3) the reactive gas is introduced into the film formation chamber, and the chemical vapor deposition raw material and the reactive gas are caused to react with each other at a system pressure of 100 Pa for 20 seconds;

(4) the unreacted reactive gas and a by-product gas are evacuated from the system through argon purging for 30 seconds;

(5) the vapor of triethylaluminum vaporized under the conditions of a raw material vessel temperature of 50° C. and a raw material vessel internal pressure of 100 Pa is introduced into the film formation chamber, and triethylaluminum is deposited on the surface of the silicon substrate at a system pressure of 100 Pa for 10 seconds;

(6) the vapor of triethylaluminum not having been deposited is evacuated from the system through argon purging for 15 seconds;

(7) the reactive gas is introduced into the film formation chamber, and triethylaluminum and the reactive gas are caused to react with each other at a system pressure of 100 Pa for 20 seconds; and (8) the unreacted reactive gas and a by-product gas are evacuated from the system through argon purging for 30 seconds.

[Comparative Example 2] Production of Thin-Film by ALD Method (Conditions)

Reaction temperature (substrate temperature): 300° C., reactive gas: ozone

A series of steps consisting of the following steps (1) to (8) was defined as one cycle, and the cycle was repeated 50 times:

(1) the vapor of the chemical vapor deposition raw material vaporized under the conditions of a raw material vessel temperature of 140° C. and a raw material vessel internal pressure of 100 Pa is introduced into a film formation chamber, and the chemical vapor deposition raw material is deposited on the surface of the silicon substrate at a system pressure of 100 Pa for 10 seconds;

(2) the vapor of the chemical vapor deposition raw material not having been deposited is evacuated from the system through argon purging for 15 seconds;

(3) the reactive gas is introduced into the film formation chamber, and the chemical vapor deposition raw material and the reactive gas are caused to react with each other at a system pressure of 100 Pa for 20 seconds;

(4) the unreacted reactive gas and a by-product gas are evacuated from the system through argon purging for 30 seconds;

(5) the vapor of triethylaluminum vaporized under the conditions of a raw material vessel temperature of 50° C. and a raw material vessel internal pressure of 100 Pa is introduced into the film formation chamber, and triethylaluminum is deposited on the surface of the silicon substrate at a system pressure of 100 Pa for 10 seconds;

(6) the vapor of triethylaluminum not having been deposited is evacuated from the system through argon purging for 15 seconds;

(7) the reactive gas is introduced into the film formation chamber, and triethylaluminum and the reactive gas are caused to react with each other at a system pressure of 100 Pa for 20 seconds; and (8) the unreacted reactive gas and a by-product gas are evacuated from the system through argon purging for 30 seconds.

TABLE 2

| | Chemical vapor deposition raw material | Thickness of thin-film | Compound of thin-film | Carbon content in thin-film |
|---|---|---|---|---|
| Example 5 | Compound No. 9 | 3.8 nm | Yttrium aluminate | Undetectable[*1] |
| Example 6 | Compound No. 11 | 4.3 nm | Yttrium aluminate | Undetectable[*1] |

TABLE 2-continued

| | Chemical vapor deposition raw material | Thickness of thin-film | Compound of thin-film | Carbon content in thin-film |
|---|---|---|---|---|
| Example 7 | Compound No. 21 | 3.5 nm | Erbium aluminate | Undetectable[*1] |
| Example 8 | Compound No. 23 | 4.1 nm | Erbium aluminate | Undetectable[*1] |
| Comparative Example 1 | Comparative Compound 1 | 2.0 nm | Yttrium aluminate | 5 atm % |
| Comparative Example 2 | Comparative Compound 2 | 2.2 nm | Yttrium aluminate | 6 atm % |

[*1]The detection limit is 0.1 atm %.

While the residual carbon content in the yttrium aluminate thin-film obtained by the ALD method was 5 atm % or more in each of Comparative Examples 1 and 2, the residual carbon content was less than 0.1 atm %, which is the detection limit, in each of Examples 5 to 8. That is, it was shown that the use of the thin-film forming raw material of the present invention provided a high-quality thin-film having a low residual carbon content. In addition, while the thickness of the resultant thin-film was 2.2 nm or less in each of Comparative Examples 1 and 2, the thickness was 3.5 nm or more in each of Examples 5 to 8. That is, it was shown that the use of the thin-film forming raw material of the present invention provided a thin-film with high productivity. In each of Comparative Examples 1 and 2, the step of introducing triethylaluminum serving as an aluminum compound into the film formation chamber was required in addition to the step of introducing the chemical vapor deposition raw material into the film formation chamber. Accordingly, in each of Comparative Examples 1 and 2, the number of production steps for the thin-film was large, and hence the productivity of the thin-film was low.

As described above, each of Compound No. 9, Compound No. 11, Compound No. 21, and Compound No. 23 had a low melting point and high thermal stability, and was hence able to provide a high-quality thin-film with high productivity when used as a chemical vapor deposition raw material, especially as a thin-film forming raw material for an atomic layer deposition method. Accordingly, it was shown that the thin-film forming raw material of the present invention was excellent as a chemical vapor deposition raw material, especially as a thin-film forming raw material for an atomic layer deposition method. In particular, each of Compound No. 11 and Compound No. 23 was able to provide a high-quality thin-film with higher productivity.

The invention claimed is:

1. A thin-film forming raw material, comprising an

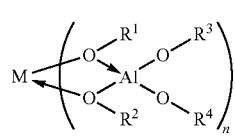

alkoxide compound represented by the following general formula (1):

where
$R^1$ is a sec-butyl group,
$R^2$ is a sec-butyl group,
$R^3$ is a sec-butyl group,
$R^4$ is a sec-butyl group,
M represents a rare earth metal atom, and
"n" represents a valence of the rare earth metal atom.

2. The thin-film forming raw material according to claim 1, wherein M represents an yttrium atom or an erbium atom.

3. The thin-film forming raw material according to claim 1, wherein the thin-film forming raw material is a thin-film forming raw material for an atomic layer deposition method.

4. A thin-film, which is produced by using the thin-film forming raw material of claim 1.

5. A method of producing a thin-film, comprising forming a thin-film containing a rare earth metal atom on a surface of a substrate through use of the thin-film forming raw material of claim 1.

6. The method of producing the thin-film according to claim 5,
wherein the method comprises:
introducing a raw material gas obtained by vaporizing the thin-film forming raw material into a film formation chamber having set therein the substrate; and
subjecting the alkoxide compound represented by the general formula (1) in the raw material gas to decomposition and/or a chemical reaction, to thereby form the thin-film containing a rare earth metal atom on the surface of the substrate.

7. The method of producing the thin-film according to claim 6,
wherein the method further comprises, between the raw material introduction and the thin-film formation, causing the thin-film forming raw material to be adsorbed to the surface of the substrate, to thereby form a precursor thin-film, and
wherein the thin-film formation includes causing the precursor thin-film to react with a reactive gas, to thereby form the thin-film containing a rare earth metal atom on the surface of the substrate.

* * * * *